United States Patent [19]

Kawakubo et al.

[11] Patent Number: 5,096,519
[45] Date of Patent: Mar. 17, 1992

[54] PROCESS FOR PREPARATION OF CARBON FIBER COMPOSITE REINFORCED CARBONACEOUS MATERIAL

[75] Inventors: Takamasa Kawakubo; Etsuro Oota, both of Gunma, Japan

[73] Assignee: Mitsubishi Pencil Co., Ltd., Japan

[21] Appl. No.: 483,491

[22] Filed: Feb. 22, 1990

[30] Foreign Application Priority Data

Feb. 23, 1989 [JP] Japan .................. 1-41662

[51] Int. Cl.⁵ .............................. C01B 31/02
[52] U.S. Cl. ................... 156/89; 156/242; 264/29.6; 264/136; 264/137; 264/257; 264/258; 423/447.4; 423/447.7
[58] Field of Search ............ 264/29.1, 29.5, 29.6, 264/29.7, 136, 137, 257, 258; 156/155, 242, 245, 308.2; 423/445, 447.1, 447.2, 447.4, 447.7, 447.8, 448, 449

[56] References Cited

U.S. PATENT DOCUMENTS

| | | | |
|---|---|---|---|
| 3,847,833 | 11/1974 | Bailey et al. | 423/447.8 X |
| 3,859,158 | 1/1975 | Park | 156/155 X |
| 4,659,444 | 4/1987 | Iwata et al. | 264/29.5 X |
| 4,911,983 | 3/1990 | Otani et al. | 428/408 |

FOREIGN PATENT DOCUMENTS

| | | | |
|---|---|---|---|
| 251596 | 1/1988 | European Pat. Off. | 264/29.5 |
| 63-182208 | 7/1988 | Japan | 264/105 |

Primary Examiner—Leo B. Tentoni
Attorney, Agent, or Firm—James A. Wong

[57] ABSTRACT

A process for preparation of a carbon fiber composite reinforced carbonaceous material characterized in that using carbon fibers or the raw material fibers of the carbon fibers as the base material, the surfaces of said base material fibers even to the surface of the single fiber are uniformly and completely coated with dormant mesophase pitch and/or isotropic pitch, and after said base material has been molded, the resulting product is subjected to carbonization treatment or graphitization treatment.

9 Claims, No Drawings

PROCESS FOR PREPARATION OF CARBON FIBER COMPOSITE REINFORCED CARBONACEOUS MATERIAL

BACKGROUND OF THE INVENTION

1. Field of the Invention

The present invention relates to a process for preparing a high performance composite carbon fiber reinforced carbonaceous material (hereinafter referred to as "CFRC") which is compositely reinforced with carbon fibers.

2. Prior Art

CFRC has been used, for instance, in leading edges of high speed aircraft, nozzles or nose cones of rockets, disk rotors, and pads for friction in brakes, etc., because it is light, highly heat-resistant, characterized by high strength at a high temperature and is excellent in abrasion resistance as material adapted for use in the parts exposed to high temperatures or generating severe friction.

Heretofore, CFRC has been prepared mainly by a liquid phase impregnation process and a chemical vacuum deposition process (hereinafter referred to as "CVD process"). In the liquid phase impregnation process of preparing CFRC, prepregs of woven fabrics of carbon fibers impregnated with a resin such as phenol resin, furan resin, epoxy resin, urea resin, etc., are laminated as a matrix and molded under heat and pressure, and after carbonization, they are further graphitized by heating to a temperature close to 3000° C. However, this process appeared to be unsatisfactory in that the structure of the product obtained thereby becomes loose due to gases generated as a result of thermal decomposition of the resin in the course of the carbonization and graphitization. For the foregoing reason, in order to obtain a complete product, the step, wherein the product once subjected to the graphitization treatment is impregnated with pitch under pressure and again subjected to the carbonization and graphitization treatments, has been repeated many times over until the desired density of the product is attained. The repeated carbonization and graphitization treatments required considerable labor, energy, and time. In addition to the above, besides the gases which are generated by the thermal decomposition of the resin in the course of the carbonization of the prepreg product of the carbon fibers impregnated with a resin in such a liquid phase impregnation process, crack formation and interlayer separation are caused owing to the thermal stress strain generated in the product as a result of the difference between the volume contraction of the resin accompanying the carbonization and the coefficient of thermal expansion of the carbon fibers, which lowers the shearing strength or damages the product greatly, so that the production yield has been considerably aggravated.

Further, in this liquid phase impregnation process one cannot take advantage of the mesophase pitch, the molecular weight of which has been made so high that it does not dissolve in solvent.

The CVD process is a process in which a gaseous organic compound is brought in contact with the carbon fiber base material heated to a high temperature under a diminished pressure so as to deposit carbon atoms on the base material. It has been noted in the CVD process that the state of carbon deposition becomes uneven due to lack of uniformity of the heat conductivity of the carbon fiber base material, or a thick molded product with a differing structure between the internal portion and the surface portion, characteristics which are undesirable. Moreover, since the steps required are complicated and time-consuming in both the liquid phase impregnation process and the CVD process, it has been one of the reasons that it is expensive to make CFRC.

On the other hand, anyone would be able to think of the idea that if, as the matrix, use is made of a fine powder or bulk mesophase of raw coke which was preliminarily heat-treated so as to increase the yield in the residual carbon in place of the liquid matrix, fewer components will volatilize in the carbonization, rendering it possible that the baking is achieved in a short period of time with a decreased volume contraction, so that the stress strain in the molded body also decreases and the defects such as the crack formation, interlayer separation, etc., are eliminated and thus the most desired process for preparation of CFRC can be realized. Nevertheless, to tell the truth, it is very difficult to uniformly and, moreover, sufficiently adhesively coat the surfaces of the base material carbon fibers with a fine powder or bulk mesophase of raw coke; and therefore, it is the present state that good CFRC has not as yet been produced.

In view of the above described defects, the invention of this application was accomplished, and its object is to provide a carbonaceous material which can exhibit the ideal composite effect in preventing the crack formation, interlayer separation between the laminated layers of the base material during the manufacturing course of the carbonaceous material reinforced with carbon fibers or CFRC.

SUMMARY OF THE INVENTION

The object of the present invention is to provide an improved process for preparing a composite carbon fiber reinforced carbonaceous material, characterized in that in the preparation of a high performance carbon-carbon composite reinforced material, which is compositely reinforced with carbon fibers, a base material consisting of carbon fibers or the raw material fibers of the carbon fibers together with a low molecular weight organic compound as a raw material of pitch are thrown into a liquid, in which a mixture of molten salts containing a large amount of Lewis acid catalyst is a solvent and concurrently a catalyst, and subjected to a heat treatment with stirring so as to uniformly coat all surfaces of the base material fibers with a dormant mesophase pitch and/or an isotropic pitch which deposit as a bonding material being formed on the surfaces of the base material fibers in situ from the lower molecular weight organic compound, and then, after the base material thus treated by surface coating has been molded, it is subjected to carbonization treatment or graphitization treatment in an inert atmosphere.

The present inventors have made an elaborate investigation on the process which can uniformly and completely coat the base material even to the surface of the single fiber with dormant mesophase pitch and/or isotropic pitch, that is, the essential point in the process of the present invention, and discovered in the course of the investigation on the low temperature carbonization by an organic ion mechanism in the molten salts at room temperature a phenomenon such that the dormant mesophase pitch and/or the isotropic pitch that are formed at much lower temperatures as compared with the ordinary carbonization reaction deposit uniformly on the surfaces of the particles already present in the reaction system with the particles acting as nuclei. Thereupon, by carrying out the polymerization reaction of a low molecular weight organic compound in such a state that carbon fibers or the raw material fibers of the carbon fibers as the base material are coexistent therewith in molten salts, the organic compound was made into dormant mesophase pitch and/or isotropic pitch, and whether the pitch in the state of mesophase and/or the isotropic pitch can uniformly and completely adhere to the carbon fibers or the raw material fibers of the carbon fibers even to the surface of the single fiber or not was examined, and as a result, it was confirmed that good coating was made.

Furthermore, using the base material coated with this dormant mesophase pitch and/or the isotropic pitch, but without adding any bonding material thereto, the base material was molded under pressure according to the routine method, and then baked. As a result, it was found possible to prepare at will the CFRC which is extremely homogeneous, high in mechanical strength, and compact as a novel carbonaceous molded product capable of designing the material quality and excellent in dimensional accuracy.

Herein, explanation will be given to one kind of molten salts used in the present invention, which is liquid at room temperature or at a low temperature below 100° C. To begin with, the organic cationic molten salt which is liquid at room temperature can be obtained by mixing one equivalent of alkylpyridinium halide or alkylimidazolium halide with one equivalent or more of aluminum chloride, etc., as the Lewis acid catalyst and, if necessary, by heating to about 100° C. for melting.

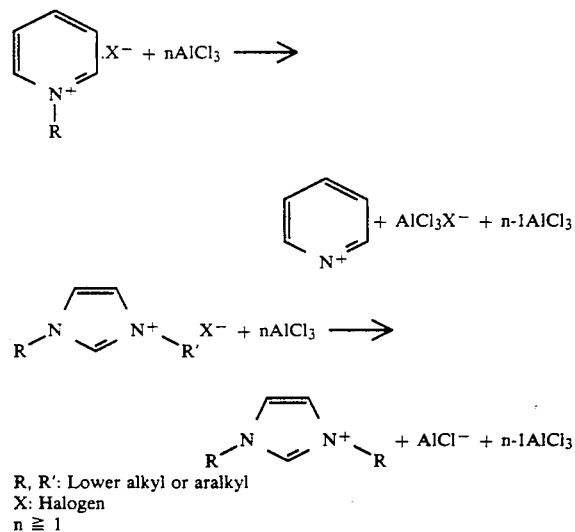

R, R': Lower alkyl or aralkyl
X: Halogen
n ≧ 1

The composition of this solution is, as shown by the right sides of the equations, characterized in that the greater part consists of ions, and a large amount of aluminum chloride is present. By blowing dichloroethane or trichloroethane mixed with argon into these molten salts, it was found that in either case dehydrochlorination occurred at 100°-300° C. and in most cases, there is obtained a mesophase pitch containing 80% or more of BI component (insolubles in benzene).

Next, the inorganic molten salt can be obtained, for instance, as a ternary system of aluminum chloride, sodium chloride, and potassium chloride (melting point 95° C.) having the composition as shown below.

$$0.60\ AlCl_3 + 0.26\ NaCl + 0.14\ KCl$$

$$0.26\ Na^+ + 0.14\ K^+ + 0.40\ AlCl_2^- + 0.20\ AlCl_3$$

In these molten salts, aromatic hydrocarbons are readily susceptible to dehydropolycondensation, and tar, pitch, or coke (raw coke) are formed in high yields at 200°-300° C.

For instance, from naphthalene there is formed black flaky carbonization product, whose BI content was 92%, with the H/C atomic ratio of the BI component being 0.42. In such a case, by controlling the reaction temperature and time, the state of the product obtained could be varied from the state of coke to the state of dormant mesophase pitch, the state of isotropic pitch, and the state of tar.

The reactivity series of aromatic hydrocarbons is as follows:

Anthracene > naphthalene > phenamthrene > stilbene > biphenyl > benezene > quinoline Now, with reference to Examples, the present invention will be explained below.

EXAMPLE 1

In a reaction vessel, 2 mols of aluminum chloride was added to 1 mol of ethylpyridinium bromide which was synthesized from ethyl bromide and pyridine in an atmosphere of argon, and heated to 100° C. to give a complete solution. Then, by cooling to room temperature, there was obtained a molten salt mixture which was liquid at room temperature. To this reaction solution was added with stirring 15 g of carbon fiber fabric (PAN system manufactured by Toyo Rayon Co., Ltd.; Toreka Cloth plain weave #6343) cut into a square of 50 mm side, and heated slowly to 230° C., which temperature was held for 5 hours, and then heating was stopped and after cooling the reaction product was poured into ice water. After washing with water, the reaction product was filtered and dried, whereby there was obtained a product in the form of a sheet for molding which was the material aimed at for CFRC in which the dormant mesophase pitch was uniformly coated on the surfaces of the carbon fibers.

Next, these sheets for molding were laminated, and put between two graphite disks 60 mm in diameter to be set in a die of a hot press, wherein the laminated product was molded at room temperature under a diminished pressure of $5 \times 10^{-3}$ Tor with 20 MPa of load being applied from above and below (5° C./min.), and held at that temperature for 10 minutes, followed by cooling. After cooling, the molded product was withdrawn. As for the mechanical characteristics of the CFRC obtained, it was found in the observation of the stress-strain curve that no carbon fiber was in the state capable of being pulled out by the occurrence of brittle fracture. This indicates that the bonding strength at the boundary surface between the carbon fibers and the matrix is higher than the strengths of the carbon fibers and the matrix themselves. The observation of a fractured section of this CFRC under a scanning electron microscope showed that the matrix component was satisfactorily bonded with the carbon fibers to such an extent that it spread on the surface of each of the individual fibers. It was also observed that the graphitization of the matrix due to the stress between the fibers had been occurring.

EXAMPLE 2

In a reaction vessel, a mixture of 2.40 mols of aluminum chloride, 0.56 mol of potassium chloride, and 1.04 mols of sodium chloride was melted (melting point 95° C.) in an atmosphere of argon. In this molten salt mixture were thrown 50 g of chopped strands about 6 mm in length (KCP-5002, manufactured by Kureha Chemical Industry Co., Ltd.) and 50 g of naphthalene, and stirred at 100° C. until the whole mixture became homogeneous. Further, the temperature was elevated up to 230° C., and this temperature was held for 5 hours to continue the reaction. After the reaction was complete, heating was stopped, and after cooling, the reaction product was withdrawn, poured into ice water, washed with water, and then filtered. Finally, by drying this, there was obtained 98 g of the material aimed at for molding, in which the dormant mesophase pitch was uniformly coated on all the surfaces of the carbon fibers. This was set in a die of a hot press and molded at room temperature under a diminished pressure of $5 \times 10^{-3}$ Torr with 20 MPa of load being applied from above and below. Then, the molded product was heated up to 1500° C. (5° C./min.) while applying the same force in an atmosphere of nitrogen, and held at that temperature for 10 minutes, followed by cooling. After cooling, the molded product was withdrawn. The observation of the fractured section of the CFRC obtained indicated that the matrix component was satisfactorily bonded with the carbon fibers to such an extent that it spread on the surface of each of the individual fibers.

EXAMPLE 3

In a reaction vessel, 50 g of oxidized fibers (two of 12,000 filaments) which were a product of an intermediate treatment in the manufacture of carbon fiber of PAN system was immersed in the organic molten salts used in Example 1, and 50 g of naphthalene manufactured by Tokyo Kagaku Co., Ltd.) was added thereto with stirring. The resulting mixture was heated slowly to 230° C., which temperature was held for 5 hours, and the heating was stopped. After cooling, the reaction product was poured into ice water, washed with water, and filtered. Finally, by drying this, there was obtained 90 g of powder aimed at for the novel carbonaceous material, in which the dormant mesophase pitch was uniformly coated on the surfaces of the oxidized fibers. The oxidized fibers coated with the dormant mesophase pitch were drawn in the direction of the fiber axis, and taking care lest the fibers should sag, intertwine, intermingle, and so on, they were arranged in parallel between the upper and lower die plates and set in a hot press, wherein they were molded at room temperature under a diminished pressure of $5 \times 10^{-3}$ Torr with 20 MPa of load being applied from above and below. Then, the molded product was heated up to 1000° C. (5° C./min.) while applying the same force in an atmosphere of nitrogen, and held at that temperature for 10 minutes, followed by cooling. After cooling, the molded product was withdrawn. The fractured section of the CFRC obtained showed that the fibers and the matrix were completely bonded into a unitary structure so that even by the observation under a polarizing microscope no distinct light and darkness could be seen even by rotating the polarizer.

It will be apparent to those skilled in the art that various changes may be made without departing from the scope of the invention; and therefore, the invention is not limited to what is described in the specification but only as indicated in the appended claims.

What is claimed is:

1. A process for preparing a composite carbon fiber reinforced carbonaceous material consisting of the steps of:

mixing a carbon fiber base material with a low molecular weight organic compound in a molten salt containing a large amount of Lewis acid catalyst, heating and stirring the mixture thereby forming in situ a dormant mesophase pitch which uniformly coats all surfaces of the base material, molding the coated base material, and heating the molded material in an inert atmosphere thereby carbonizing it.

2. The process for preparing the carbonaceous material as set forth in claim 1, wherein said molten salt is selected from an organic cationic molten salt.

3. The process for preparing the carbonaceous material as set forth in claim 1, wherein the base material is a one-dimensionally oriented material of carbon fiber and said molding step of the resulting base material is carried out by placing in a metallic mold in parallel and pressing with a pushrod while heating thereof.

4. The process for preparing the carbonaceous material as set forth in claim 1, wherein the base material is a two-dimensionally oriented material of carbon fiber and said molding step for the resulting base material is carried out by laminating a number of sheets of the base material and pressing while heating thereof.

5. The process for preparing the carbonaceous material as set forth in claim 1, wherein the base material is a three-dimensionally oriented material of carbon fiber.

6. The process for preparing the carbonaceous material as set forth in claim 1, wherein the heat treatment is carried out at below 300° C.

7. The process for preparing the carbonaceous material as set froth in claim 1, wherein said molten salt is selected from an inorganic cationic molten salt.

8. A process for preparing a composite carbon fiber reinforced carbonaceous material consisting of the steps of:

mixing a carbon fiber base material with a low molecular weight organic compound in a molten salt containing a large amount of Lewis acid catalyst, heating and stirring the mixture thereby forming in situ an isotropic pitch which uniformly coats all surfaces of the base material, molding the coated base material, and heating the mold material in an inert atmosphere thereby carbonizing it.

9. A process for preparing a composite carbon fiber reinforced carbonaceous material consisting of the steps of:

mixing a carbon fiber base material with a low molecular weight organic compound in a molten salt containing a large amount of Lewis acid catalyst, heating and stirring the mixture thereby forming in situ at least one of a dormant mesophase pitch and an isotropic pitch which uniformly coats all surfaces of the base material, molding the coated base material, and heating the molded material in an inert atmosphere thereby carbonizing it.

* * * * *